United States Patent [19]
Whitney

[11] 4,323,093
[45] Apr. 6, 1982

[54] MULTIPLE STAGE FLUID PRESSURE GOVERNOR HAVING TWO BREAK POINTS
[75] Inventor: Douglas A. Whitney, Livonia, Mich.
[73] Assignee: Ford Motor Company, Dearborn, Mich.
[21] Appl. No.: 189,992
[22] Filed: Sep. 23, 1980
[51] Int. Cl.³ .............................................. G05D 13/38
[52] U.S. Cl. ........................................ 137/56; 73/537; 73/539
[58] Field of Search ................. 137/53, 54, 56; 74/752 C; 73/510, 537, 538, 539, 550

[56] References Cited
U.S. PATENT DOCUMENTS

| | | | |
|---|---|---|---|
| 2,762,384 | 9/1956 | Rosenberger | 137/56 X |
| 3,043,322 | 7/1962 | Schulz | 137/54 |
| 3,049,028 | 8/1962 | English et al. | 74/352 |
| 3,420,251 | 1/1969 | Forster et al. | 137/54 |
| 3,431,929 | 3/1969 | Croswhite et al. | 137/56 |
| 3,559,667 | 12/1969 | Koivunen | 137/54 |
| 3,566,894 | 3/1971 | Satoh | 137/54 |
| 3,677,277 | 7/1972 | Hirozawa et al. | 137/54 |
| 3,906,975 | 9/1975 | Craig | 137/56 |
| 4,123,942 | 11/1978 | Rumyantsev | 73/535 |
| 4,164,235 | 8/1979 | Benson | 137/52 |

Primary Examiner—Robert G. Nilson
Attorney, Agent, or Firm—Donald J. Harrington; Keith L. Zerschling

[57] ABSTRACT

A flyweight governor valve assembly having a fluid pressure modulator valve element mounted within a valve chamber for axial movement, a first set of primary and secondary weights mounted on a valve sleeve that forms a part of the governor valve assembly, a second set of primary and secondary weights mounted on said sleeve for rotation about the axis of said valve assembly. A spring acting between the primary and secondary weights of each set of weights, the primary weight for one set being separated from its corresponding second weight at a first brake point speed and a primary weight of the second set of weights being separated from its associated second weight at a second brake point speed, each set of weights being pivotally carried by a lever, the operating end of which engages the valve element whereby centrifugal force acting on said weight are translated to axial shifting movement of said valve element to oppose fluid pressure forces acting thereon.

4 Claims, 6 Drawing Figures

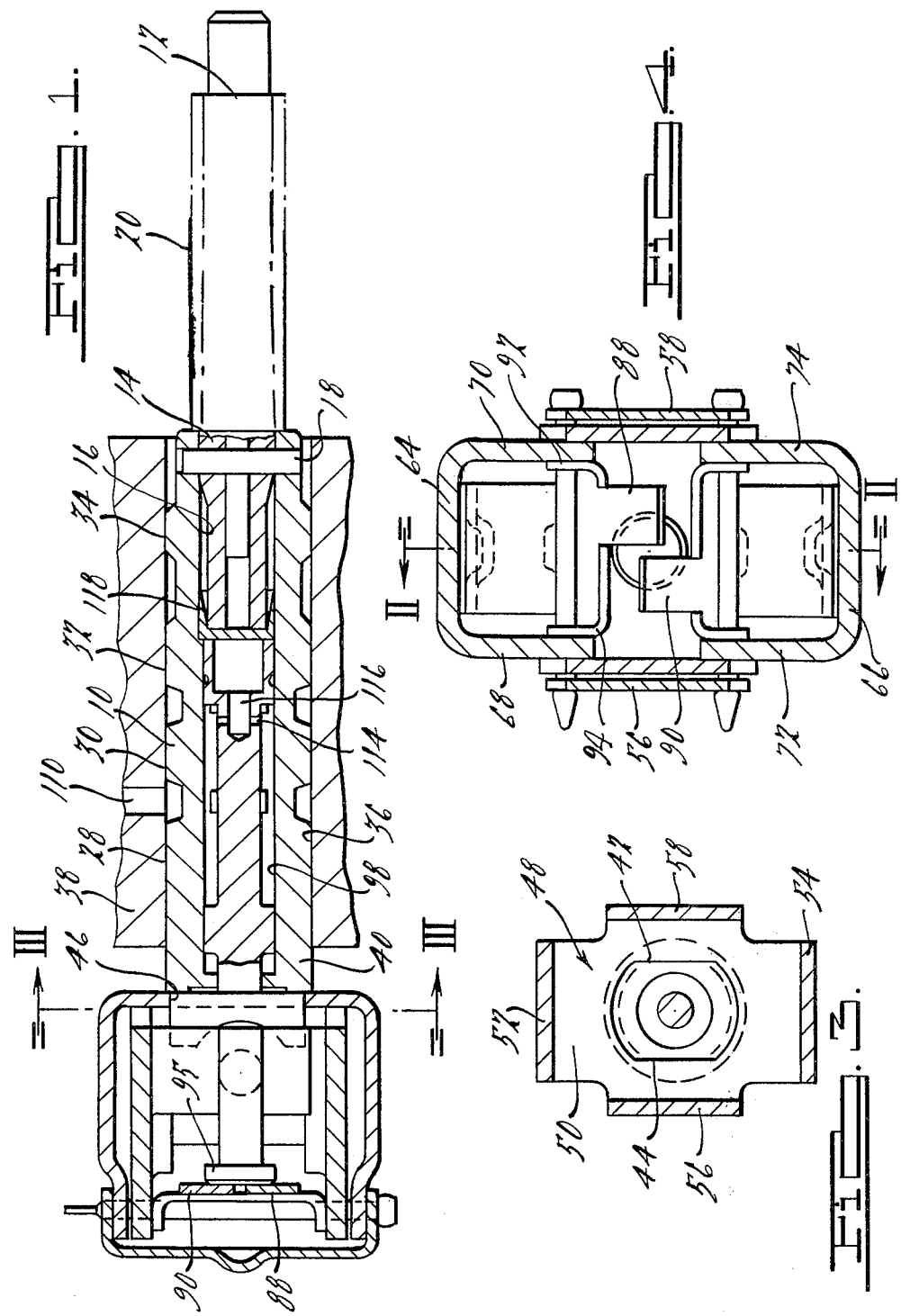

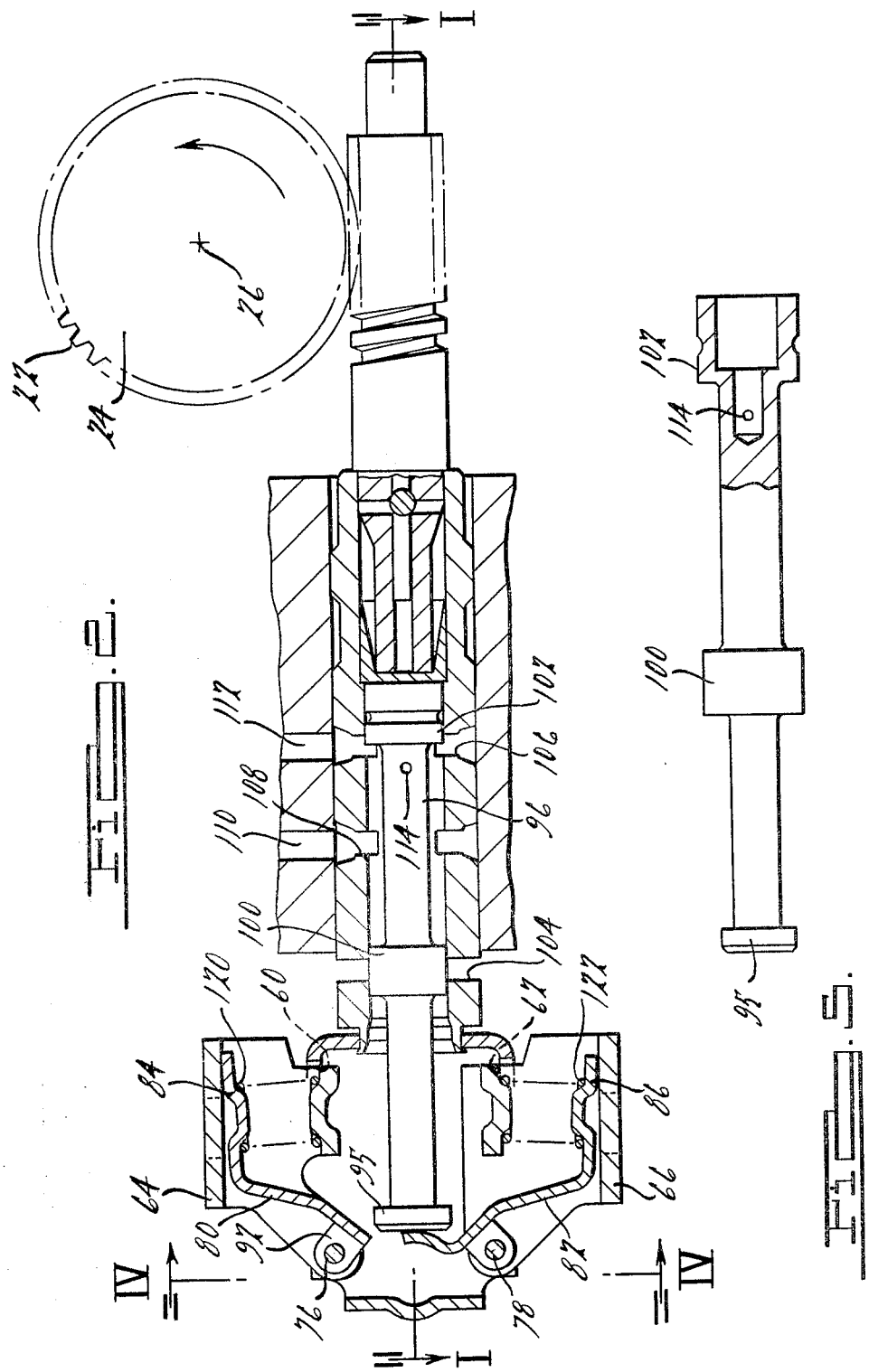

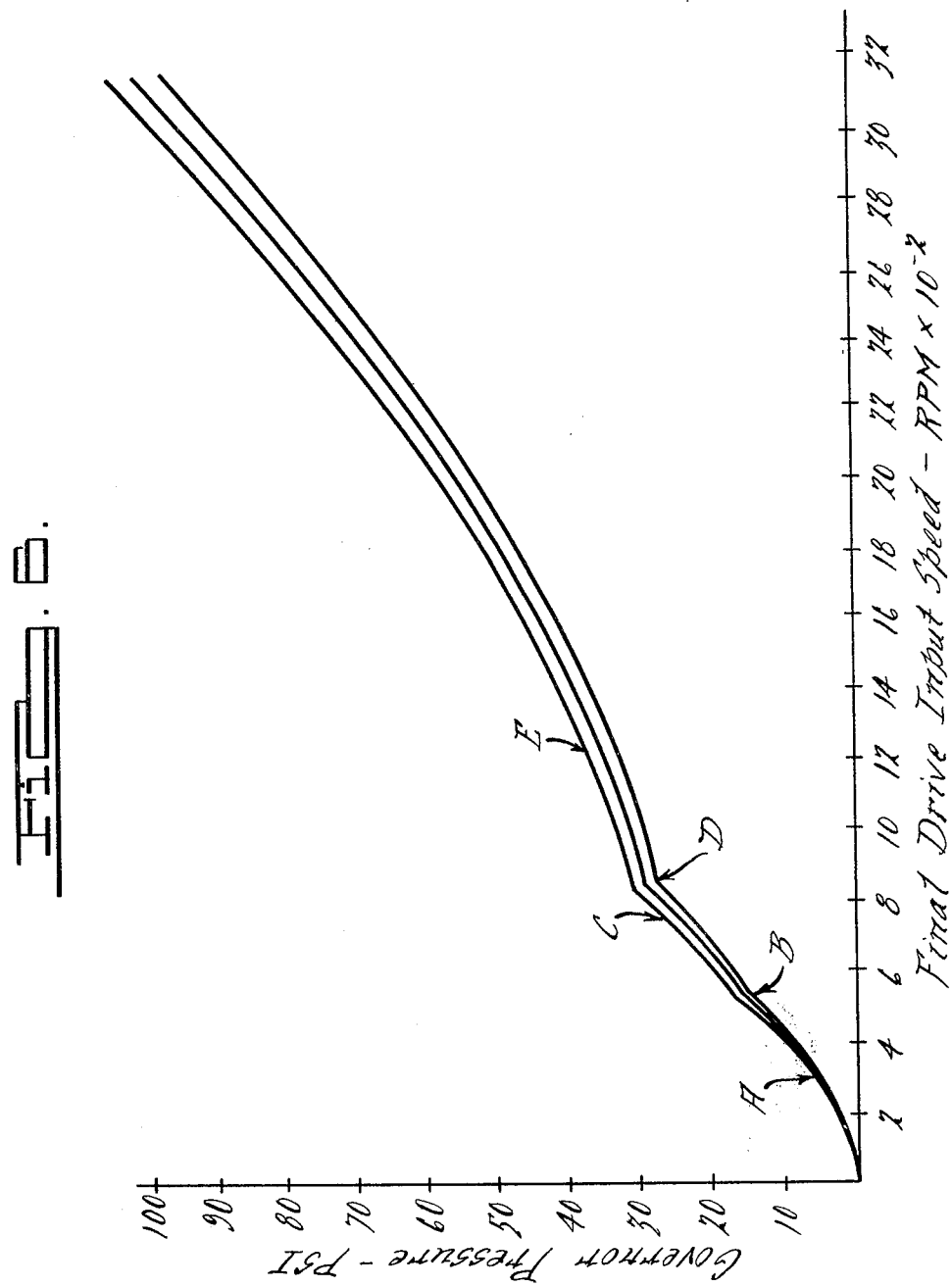

MULTIPLE STAGE FLUID PRESSURE GOVERNOR HAVING TWO BREAK POINTS

GENERAL DESCRIPTION OF THE INVENTION

This invention relates generally to automatic transmission control systems and more particularly to a speed governor mechanism for use in a control system for an automatic transmission to develop a pressure speed signal that is proportional in magnitude to the speed of rotation of a driven member. A pressure speed signal is required in such systems, as well as a torque signal, to develop automatic speed ratio changes to meet varying operating demands for the automotive vehicle driveline of which the transmission mechanism forms a part. For this purpose the valve system requires a speed signal that varies in magnitude throughout a relatively large range of driven speeds of the transmission mechanism. In order to achieve the necessary broad speed range over which a useful speed signal can be achieved, it is common practice to provide a governor valve assembly wherein the regulating characteristics of the valve elements of the assembly are changed at a predetermined speed. These changes in the operating characteristics of the valve assembly can be referred to as break-points on a graph on which the governor speed is plotted as the abscissa and output pressure is plotted as an ordinante.

I am aware of various governor valve assemblies for use in automatic transmissions wherein a break-point in the characteristic governor pressure curve is obtained. Examples of these are shown in prior art U.S. Pat. Nos. 3,049,028 and 3,043,322, which are assigned to the assignee of this invention, as well as U.S. Pat. No. 3,420,251.

The present invention makes use of simple flyweights to actuate a modulating valve element in a governor valve assembly, the centrifugal forces on the flyweights being transferred to the valve element through a simple lever arrangement wherein the assembly of the flyweights and the valve itself require a minimum radial dimension.

The improvements of this invention make use of a simple flyweight arrangement wherein provision is made for achieving the necessary break-points to provide a useful speed signal throughout a large variation of driven speeds of the governor. I am aware of various flyweight governors that are used to obtain a pressure signal, but they are incapable of providing the triple-stage characteristic of the present intion, wherein two break-points are obtained in the characteristic curve thereby providing an increased speed interval over which a useful speed signal may be obtained. Examples of such flyweight governors are shown in U.S. Pat. Nos. 3,559,667; 4,164,235; 3,677,277, 3,431,929 and 4,123,942. These prior art disclosures of centrifugally operated flyweight governors are incapable of providing the wide speed range and the double break-point governor pressure characteristic that is inherent in the improved construction of the present invention.

The present invention comprises a rotatable valve sleeve in which is situated a sliding modulating valve spool. A flyweight support is secured to the sleeve and rotatable with the sleeve, the latter being driven by a driven element of the transmission. A primary flyweight and a secondary flyweight are mounted on one side of the governor and a second set of primary and secondary flyweights is mounted on the opposite side of the governor on the diametrically opposed side. A first valve spring tends to separate the primary and secondary weights of the first set of weights and a stronger valve spring tends to separate the primary and secondary weights of the second set of weights. A lever that pivotally mounts each set of weights transfers the centrifugally induced force on the weights to the valve which balances the hydraulic forces acting on the valve. The primary weight of the first set of weights becomes bottomed out on a stop to achieve the first break-point while the primary and secondary weights of the second set cooperate with the secondary weight of the first set to produce a modified speed signal throughout an intermediate speed range. Upon a further increase in the speed, the primary weight of the second set of weights is bottomed out against a stop so that during subsequent operation of the governor valve assembly the centrifugally induced forces on the regulating valve are those that are developed solely by the secondary weights of each set. The distance between the break-points can be calibrated as desired by appropriately choosing the correct spring weights for each set of weights.

BRIEF DESCRIPTION OF THE FIGURES OF THE DRAWINGS

FIG. 1 is an assembly view, partly in cross section, showing the flyweights, the modulating valve element and the valve sleeve of the improved governor. It is taken along the plane of section line 1—1 of FIG. 2.

FIG. 2 is a cross sectional view taken along a plane that is 90° displaced with respect to the plane of the section of FIG. 1. It is taken along the plane of section line 2—2 of FIG. 4.

FIG. 3 is a cross sectional view taken along the plane of section line 3—3 of FIG. 1.

FIG. 4 is a cross sectional view taken along the plane of section line 4—4 of FIG. 2.

FIG. 5 is a detail view, partly in section, of the modulating valve shown in FIGS. 1 and 2.

FIG. 6 is a chart showing the governor pressure and governor speed relationship for the improved governor for FIGS. 1 through 5.

PARTICULAR DESCRIPTION OF THE INVENTION

In FIG. 1 reference numeral 10 designates a governor valve sleeve and reference numeral 12 designates a drive shaft for the governor. The sleeve 10 and the shaft 12 are aligned longitudinally on a common axis. The shaft 12 has a reduced diameter end 14. It is received in a central opening 16, and a drive pin 18 extends through transverse openings formed in the end 14 and the sleeve 16 to provide a driving connection between the sleeve 10 and the shaft 12. Shaft 12 is formed with gear teeth 20 which are adapted to drivably engage gear teeth 22 formed on governor drive gear 24 mounted for rotation about a transverse axis 26. The gear 24 and the shaft 12 thus are drivably connected with a worm drive connection in a cross-drive arrangement.

The sleeve 10 comprises multiple lands separately designated by reference characters 28, 30, 32 and 34. Sleeve 10 is rotatably disposed in a valve opening 36 formed in governor valve body 38. The end of sleeve 10 extends outwardly as shown at 40. The end 40 is formed with a pair of flats as shown in FIG. 3 at 42 and 44. It is received in opening 46 formed in a flyweight carrier member 48. This carrier includes a radially extending portion 50 and four axially extending portions 52, 54, 56 and 58. Portions 52 and 54 are diametrically opposed to each other with respect to the axis of the sleeve 10 and portions 56 and 58 are diametrically disposed with respect to each other and 90° out of position with respect to the portions 52 and 54. Portions 52 and 54 extend forwardly as seen in FIG. 2 sufficiently far to form radial stops 60 and 62, respectively, which limit the radial outward movement of primary weights 64 and 66. The weights 64 and 66 may be similar in form, as indicated in FIGS. 2 and 4. They are substantially "U" shaped, weight 64 having side portions 68 and 70 and weight 66 having corresponding side portions 72 and 74. Side portions 68 and 70 are pinned to the longitudinally extending portions 56 and 58 of the member 48 by means of a pivot pin 76. Another pivot pin 78 extending through portions 56 and 58 of the carrier member 48 pivotally supports the weight 66.

A pair of secondary centrifugal weights is identified by reference numerals 80 and 82. They include an outer portion shown at 84 and 86, respectively, situated within the outer portions of the weights 64 and 66. The secondary weights 80 and 82 include also inner portions 88 and 90, respectively, as best seen in FIG. 4. Weight 80 has a pair of tabs 92 and 94 through which the pin 76 extends. Thus both weights 64 and 80 are pivotally mounted on the same pin for radial displacement in response to centrifugal forces due to rotation of the sleeve 10. Similarly, the secondary weight 82 has a pair of tabs through which pin 78 extends thereby providing a pivotal connection with the member 48 that is common to the pivotal connection between the primary weight 66 and the member 48.

The radially inner ends 88 and 90 of the secondary weights engage the left hand end 95 of a governor valve spool 96. This spool is slidably disposed in valve opening 98 formed in sleeve 10. Valve spool 96 has formed thereon a pair of spaced valve lands 100 and 102. These slidably register with valve ports 104 and 106, respectively. The space within the valve opening 98 between the lands 100 and 102 is in communication with governor pressure outlet port 108 formed in the sleeve 110. This in turn communicates with governor passage 110 formed in valve housing 38.

A governor feed passage 112 supplies control pressure to the governor assembly. Passage 112 communicates with the right hand side of the land 102 through the orifice 114 thereby establishing a pressure force acting in a left hand direction as seen in FIG. 2 which is opposed by the mechanical force developed by the centrifugal weights. Orifice 114, as seen in FIG. 1, communicates with longitudinal passage 116 extending to the right side of the valve spool 96. The valve opening 98 has its right hand extremity defined by closure member 118 which is received in opening 16 formed in the right hand end of the sleeve 10.

Weight 80 and the secondary weight 64 are held in contact, as seen in FIG. 2, by valve spring 120. Similarly, secondary weight 82 and primary weight 66 are held in contact by valve spring 122. The rate of the spring 120 is less than the rate of the spring 122. When the valve sleeve 10 is rotated at low speeds, the centrifugal force acting on both the weights 80 and 64 and on both of the weights 82 and 66 develop a force acting in a right hand direction on the valve spool 96. This produces a characteristic shown in FIG. 6 which is identified by reference letter "A". This is a relatively fast rising governor pressure curve. When a speed corresponding to break-point "B" in FIG. 6 is reached, the centrifugal force acting on the weight 64 is sufficiently greater than the centrifugal force acting on weight 80 to cause those weights to separate, one from the other. That separation, of course, is opposed by spring 120, but at speeds greater than the break-point speed the weight of the spring is insufficient to hold the weights together. Weight 64 then moves quickly with a snap action to its extreme radially outward position where it engages the stop 60. Thereafter the weights 82 and 66 continue to function as does the weight 80. This produces a modified pressure characteristic as shown in the chart of FIG. 6 by reference letter "C".

Upon a further increase in speed to a speed corresponding to break-point "D" in FIG. 6, the spring 122 no longer is capable of holding weight 82 in contact with weight 66. Thus weight 66 moves quickly to a radial outward position with a snap action until it engages the stop 62. Thereafter the forces developed on the secondary valve spool 96 are those forces due to the centrifugal action of only the secondary weights 80 and 82. This produces a modified speed-pressure characteristic as shown by reference letter "E" in FIG. 6.

It is apparent that the present flyweight governor mechanism is capable of producing a useful speed signal throughout a wide speed range, as indicated in FIG. 6, although the radial dimensions of the assembly are desirably reduced to a minimum. This enables the governor mechanism to be packaged successfully in a transmission assembly with maximum space economy without sacrificing governor performance and reliability.

Having thus described a preferred embodiment of my invention, what I claim and desire to secure by U.S. Letters Patent is:

1. A triple stage fluid pressure governor comprising:

a governor body, a valve opening in said body, a supply pressure passage and a governor pressure passage in said body in communication with said valve opening;

a governor valve sleeve in said valve opening, said sleeve having a pressure supply port, a governor pressure port and an exhaust opening;

means for driving said sleeve rotatably in said valve opening;

a governor valve spool slidably disposed in said sleeve and having spaced valve lands that register with said supply pressure passage and said exhaust opening whereby said lands provide controlled communication between said governor pressure passage and said supply port and exhaust opening to establish a governor pressure in said governor pressure passage, a pressure area on said valve spool being in communication with said governor pressure port whereby a feedback pressure force acts on said valve spool in one direction;

a first set and a second set of primary and secondary flyweights pivotally mounted on said valve sleeve for movement away from said valve spool, each secondary flyweight having a lever portion extending toward said valve spool and adapted to transmit a valve actuating force thereto that opposes said pressure force;

first spring means having a first spring rate for holding the primary and secondary flyweights of said first set in engagement for pivotal movement in unison at speeds less than a first break-point speed, and second spring means having a second spring rate that is higher than said first spring rate for holding the primary and secondary flyweights of said second set in engagement for pivotal movement in unison at speeds less than a second break-point;

and stop means for limiting the extent of outward movement of said primary flyweights;

the lever portions of each secondary flyweight engaging said valve spool and transferring a force thereon in the direction of its axis at speeds in excess of said second break-point.

2. The combination as set forth in claim 1 wherein the lever portion of each secondary flyweight acts on said valve spool throughout a speed range extending to speeds greater than said second break-point speed, the secondary flyweight of said second set being adapted to transmit a force to said valve spool at speeds less than said second break-point speed.

3. The combination as set forth in claim 2 wherein the masses of said primary flyweights are approximately equal and the masses of said secondary flyweights are approximately equal.

4. The combination as set forth in claim 1 wherein the masses of said primary flyweights are approximately equal and the masses of said secondary flyweights are approximately equal.

* * * * *